United States Patent
Allen et al.

(10) Patent No.: US 11,046,451 B1
(45) Date of Patent: Jun. 29, 2021

(54) ANGLE OF ATTACK ESTIMATION SYSTEM AND METHOD

(71) Applicant: Rockwell Collins, Inc., Cedar Rapids, IA (US)

(72) Inventors: Keith M. Allen, Centreville, VA (US); Vladislav Gavrilets, McLean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 183 days.

(21) Appl. No.: 16/103,976

(22) Filed: Aug. 16, 2018

(51) Int. Cl.
*B64D 43/02* (2006.01)
*G06F 17/11* (2006.01)
*G01P 13/02* (2006.01)
*G08G 5/00* (2006.01)

(52) U.S. Cl.
CPC ............ *B64D 43/02* (2013.01); *G01P 13/025* (2013.01); *G06F 17/11* (2013.01); *G08G 5/0047* (2013.01)

(58) Field of Classification Search
CPC ...... G01C 23/00; G01C 23/005; G01C 19/30; G01C 21/005; G01C 21/16; G01C 21/165; G01C 21/18; G01C 21/20; B64D 43/02; G01P 13/025; G06F 17/11; G08G 5/0047
See application file for complete search history.

(56) References Cited

U.S. PATENT DOCUMENTS

| | | | | |
|---|---|---|---|---|
| 3,594,553 A | * | 7/1971 | McElroy | G05D 1/0607 244/181 |
| 2001/0039467 A1 | * | 11/2001 | Katz | G01C 21/18 701/4 |
| 2002/0111740 A1 | * | 8/2002 | Horvath | G01C 23/00 701/302 |
| 2015/0329216 A1 | * | 11/2015 | Laurens | G01P 5/14 701/6 |
| 2016/0298985 A1 | * | 10/2016 | Genito | G06F 8/61 |
| 2019/0086506 A1 | * | 3/2019 | Steinhour | G01S 11/04 |
| 2019/0369647 A1 | * | 12/2019 | Gillett | G01P 3/62 |

OTHER PUBLICATIONS

Shantha Kumar, Filtering and Fusion based Reconstruction of Angle of Attack, 2006, National Conference on Range Technology (NACORT) 2006—ITR, Chandipur (Year: 2006).*

* cited by examiner

*Primary Examiner* — Redhwan K Mawari
(74) *Attorney, Agent, or Firm* — Suiter Swantz pc llo (57) ABSTRACT

Systems and methods for determining angle of attack (AOA) for an aircraft are disclosed. In implementations, a kinematic AOA signal and an aerodynamic AOA signal are determined based on measurements received from an airspeed sensor and an inertial reference system (IRS) or attitude and heading reference system (AHRS). The kinematic AOA signal is low pass filtered and the aerodynamic AOA signal is band-pass filtered. A blended AOA signal for the aircraft is then determined by summing the filtered kinematic AOA and aerodynamic AOA signals.

20 Claims, 6 Drawing Sheets

ANGLE OF ATTACK ESTIMATION SYSTEM AND METHOD

BACKGROUND

Angle-of-attack (AOA) may be displayed as supplemental information in some cockpits. The AOA is used by pilots for awareness of stall margin and energy management. Additionally, AOA is an input signal to the Enhanced Ground Proximity Warning System (EGPWS) used on some aircrafts.

Currently, AOA is measured using either vanes or a 5-hole/3-hole probe. These sensors are expensive to install, calibrate, and maintain. These sensors are also prone to damage and deterioration because they are external to the aircraft. Accordingly, there is a need for other systems and methods for determining AOA. In particular, there is a need for systems and methods that do not require direct measurement of AOA using a vane or 5-hole/3-hole probe.

SUMMARY

In an aspect, embodiments of the inventive concepts disclosed herein are directed to a system for determining angle of attack (AOA) for an aircraft. In embodiments, the system includes an airspeed sensor, an inertial reference system (IRS) or an attitude and heading reference system (AHRS), and a controller. The controller is in communication with the airspeed sensor and the IRS. The controller is configured to determine a kinematic AOA signal and an aerodynamic AOA signal based on measurements from the airspeed sensor and the IRS. The controller is further configured to apply a low-pass filter to the kinematic AOA signal and a band-pass filter to the aerodynamic AOA signal. After filtering the signals, the controller is configured to determine the AOA signal (i.e., a blended AOA signal) for the aircraft by summing the filtered kinematic AOA and aerodynamic AOA signals.

In another aspect, embodiments of the inventive concepts disclosed herein are directed to controller for determining an AOA signal for an aircraft. In embodiments, the controller includes at least one processor with at least one memory medium communicatively coupled to the processor. The memory medium may include program instructions that are executable by the processor and configured to cause the processor to: determine a kinematic angle of attack signal and an aerodynamic angle of attack signal based on measurements from an airspeed sensor and an inertial reference system or an attitude and heading reference system; apply a low-pass filter to the kinematic angle of attack signal; apply a band-pass filter to the aerodynamic angle of attack signal; and determine the angle of attack signal for the aircraft by summing the filtered kinematic angle of attack and aerodynamic angle of attack signals.

In another aspect, embodiments of the inventive concepts disclosed herein are directed to a method for determining AOA for an aircraft. In implementations of the method, a kinematic AOA signal and an aerodynamic AOA signal are determined based on measurements received from an airspeed sensor and an IRS. The kinematic AOA signal is low pass filtered and the aerodynamic AOA signal is band-pass filtered. A blended AOA signal for the aircraft is then determined by summing the filtered kinematic AOA and aerodynamic AOA signals.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for determining angle of attack (AOA) for an aircraft based on a combination of kinematic and aerodynamic AOA signal computations. Currently, AOA is often measured using either vanes or a 5-hole/3-hole probe. These sensors are expensive to install, calibrate, and maintain. These sensors are also prone to damage and deterioration because they are external to the aircraft. The system and method disclosed herein allow for determination of AOA using an aircraft's inertial reference system (IRS) or attitude and heading reference system (AHRS), airspeed measurements, and information about the aircraft's aerodynamic characteristics. Among other advantages, the disclosed techniques do not require direct measurement of AOA using a vane or 5-hole/3-hole probe and therefore avoid installation, calibration, and maintenance issues associated therewith.

Figure 1A:
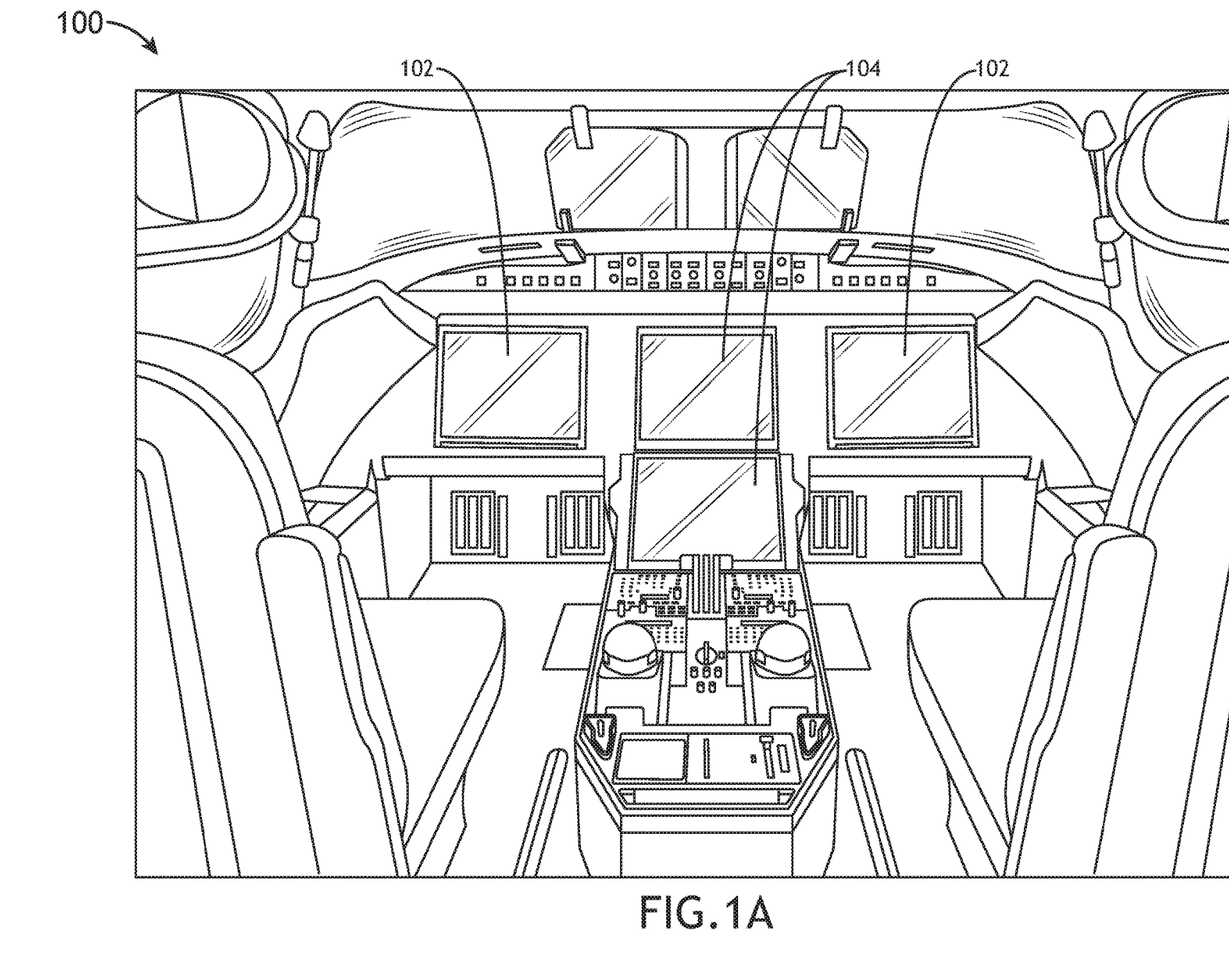
FIG. 1A is an illustration of an aircraft environment in which a system for determining angle of attack (AOA) can be implemented, in accordance with example embodiments of this disclosure.

FIG. 1A illustrates an example embodiment of an aircraft environment 100 in which a system and method for determining AOA for an aircraft may be implemented. For example, the aircraft environment 100 (e.g., a cockpit) includes one or more displays that can be employed to present AOA information, electronic maps, aircraft performance parameters, aircraft performance parameter predictions, sensor readings, aircraft data, flight data, communications, alerts, and so forth. The aircraft environment 100 in FIG. 1A is shown to include at least one primary flight display 102 and at least one multi-function display 104 that are viewable by a flight crew member (e.g., pilot). The aircraft environment 100 illustrated in FIG. 1A illustrates an example embodiment. However, in other embodiments, the aircraft 100 environment can include any number of display devices (e.g., one, two, three, or more displays) including one or more primary flight displays, secondary flight displays, and/or multi-function displays. In some embodiments, AOA determined by the system and method described herein can be presented (e.g., via display 102/104) to the pilot or other flight crew members. The AOA may also be used as an input for an autopilot system, automatic stall prevention system, or other avionics equipment on the aircraft.

The system and method for determining AOA for an aircraft can also be implemented in unmanned aerial vehicle (UAV) systems. Manned and unmanned aircrafts can benefit from the reduced footprint of the system and method for determining AOA described herein. In UAVs, this is especially true because UAVs often lack the physical space required for installation of an AOA vane.

Figure 1B:
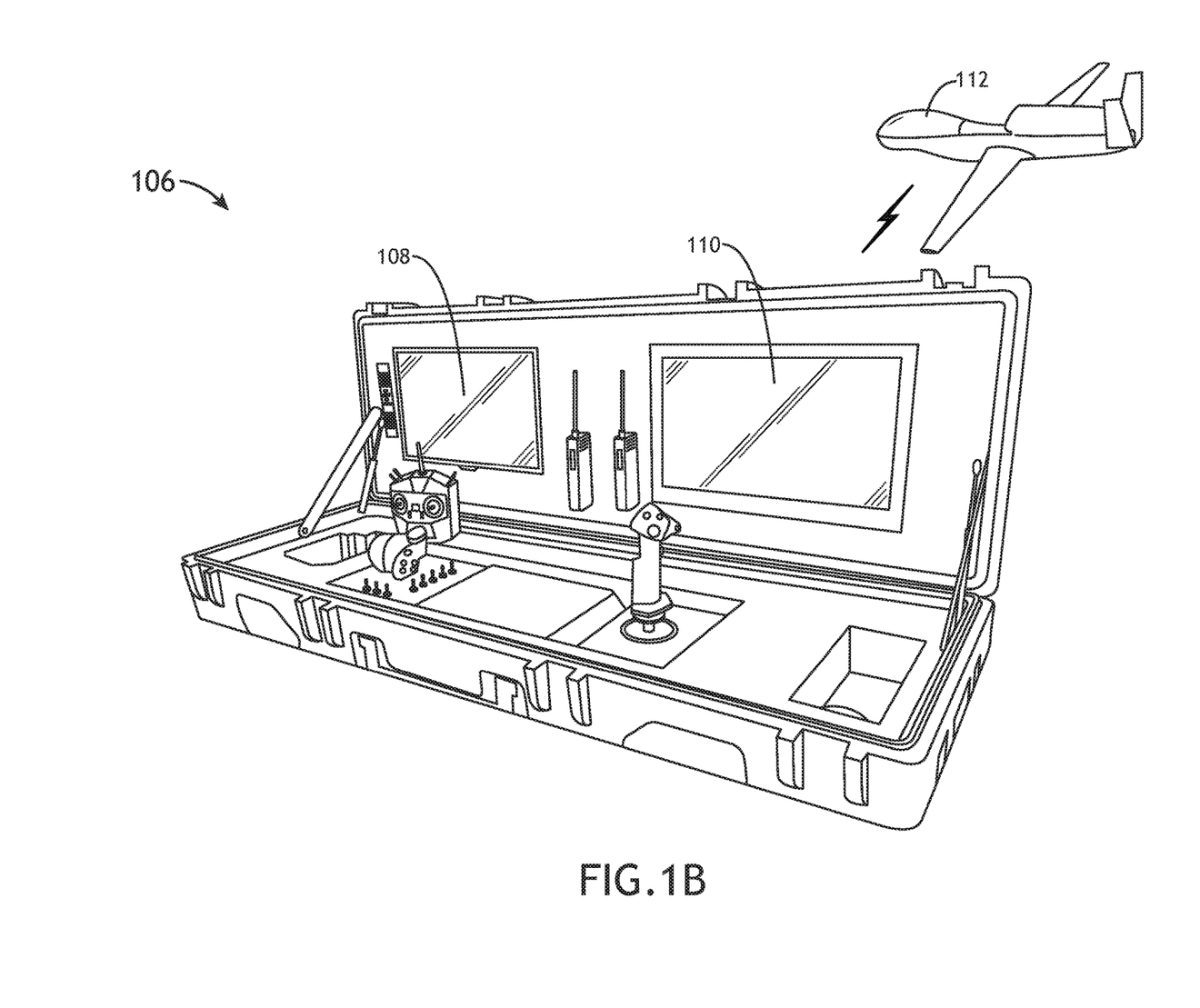
FIG. 1B is an illustration of an unmanned aerial vehicle (UAV) environment in which a system for determining AOA can be implemented, in accordance with example embodiments of this disclosure.

FIG. 1B illustrates an example embodiment of a UAV control station 106 and/or UAV 112 in which a system and method for determining AOA for an aircraft may be implemented. The UAV control station 106 may include any number of displays. For example, the UAV control station 106 in FIG. 1B is shown to include a first display 108 and a second display 110. In some embodiments, the UAV control station 106 is portable (e.g., as illustrated in FIG. 1B). In other embodiments, the UAV control station 106 may be within a facility or a moving vehicle (e.g., van, truck, boat, other aircraft, etc.). In some embodiments, AOA determined by the system and method described herein can be presented (e.g., via display 106/108) to a UAV operator. The AOA may also be used as an input for an autopilot system, automatic stall prevention system, or avionics equipment onboard the UAV 112.

Figure 2A:
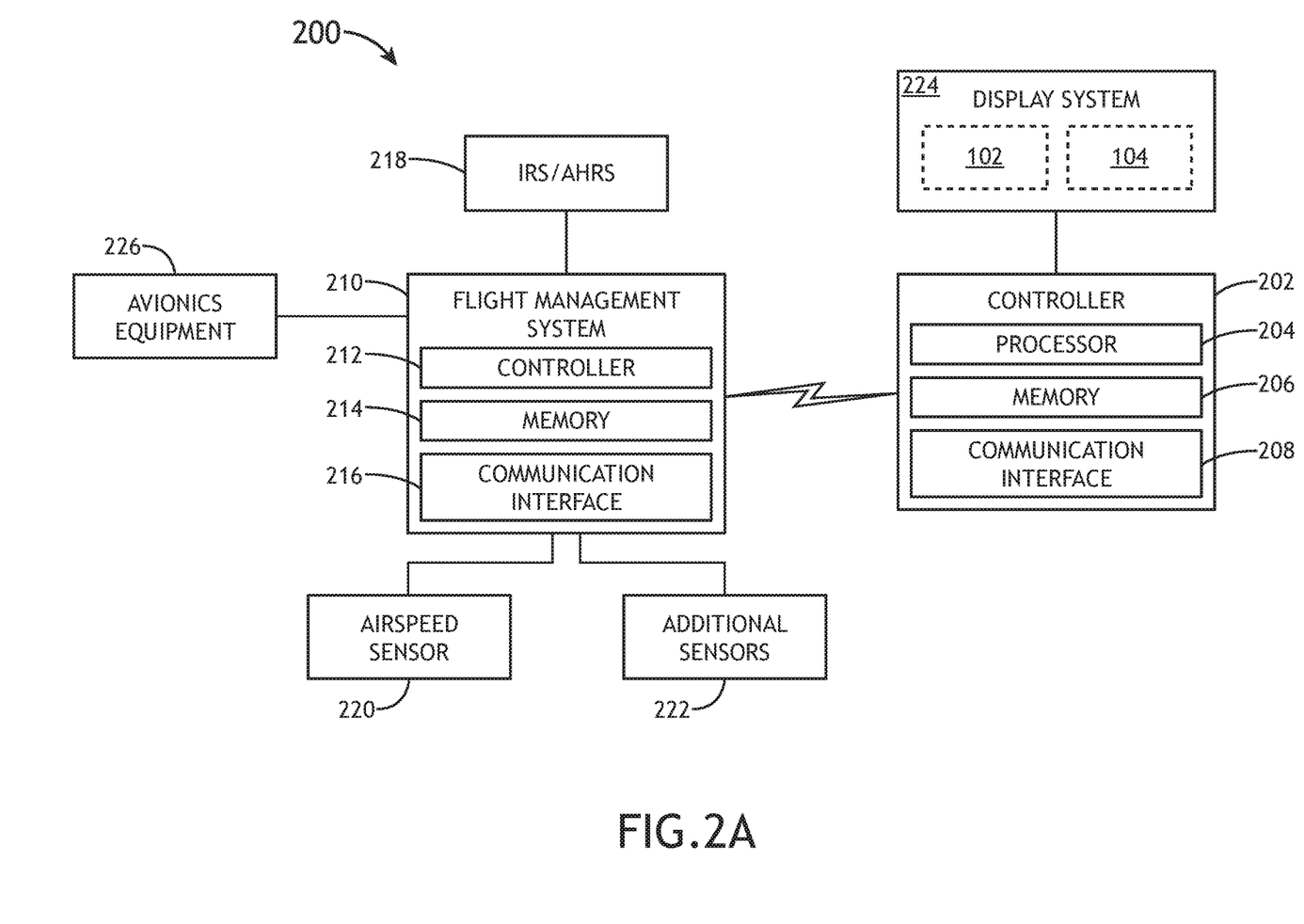
FIG. 2A is a block diagram illustrating a system for determining AOA for an aircraft, in accordance with example embodiments of this disclosure.
Figure 2B:
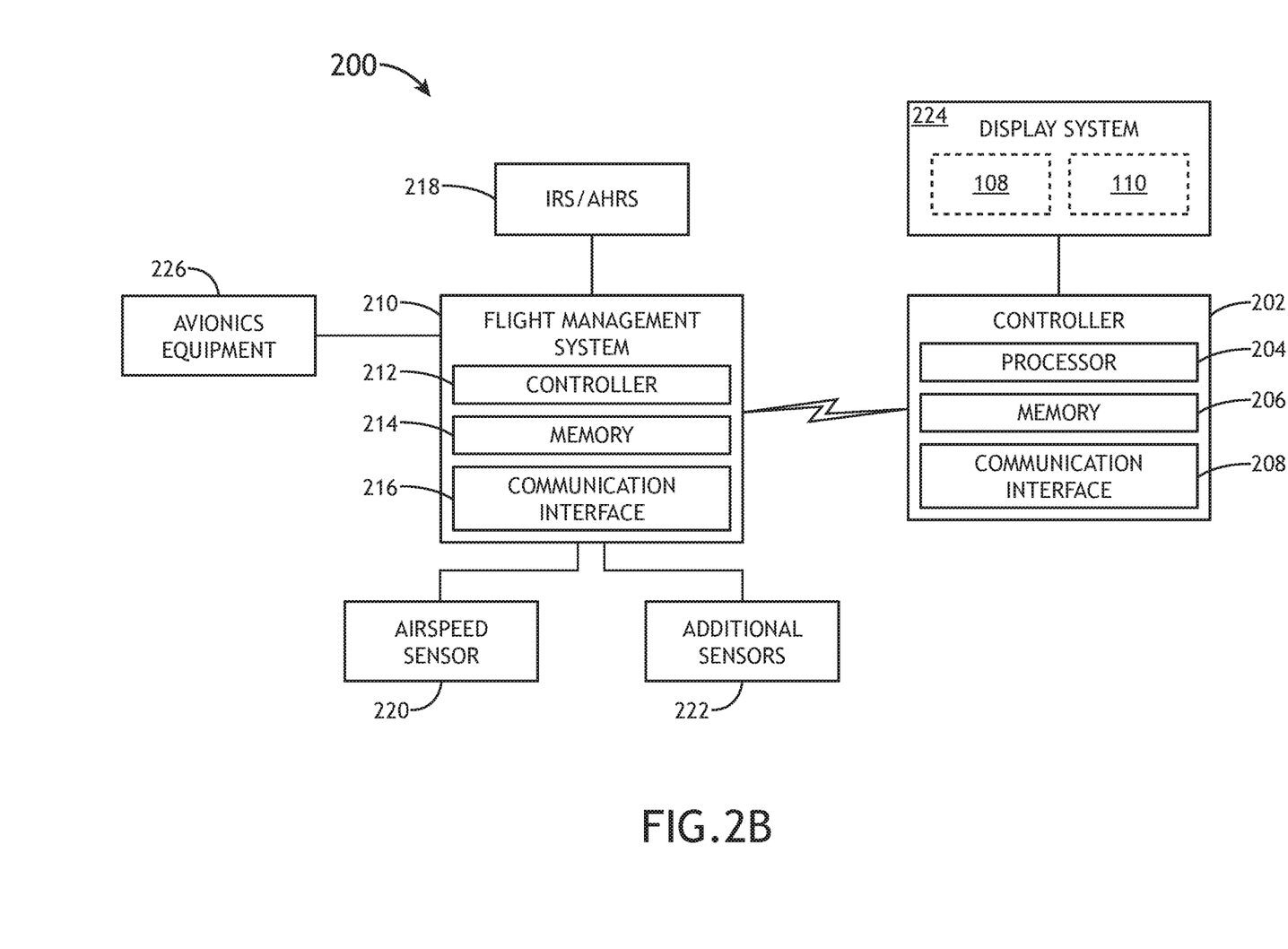
FIG. 2B is a block diagram illustrating a system for determining AOA for an aircraft, in accordance with example embodiments of this disclosure.

FIGS. 2A and 2B illustrate embodiments of a system 200 for determining AOA for an aircraft. In embodiments, the system 200 can be configured to display AOA for pilot situational awareness and/or the AOA can potentially be used as an input to autopilot software or other avionics equipment 226. The system 200 includes an aircraft display system 224 having at least one display, for example, a primary flight display 102, a multi-function display 104, or any other type of aircraft display (e.g., another onboard display, a UAV controller display 108/110, or the like). The system 200 further includes a controller 202 in communication with the aircraft display system 224. For example, the controller 202 can be communicatively coupled to and/or integrated within a structure of the aircraft display system 224.

In embodiments, the controller 202 includes a processor 204, memory 206, and a communication interface 208. The processor 204 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 204 can execute one or more software programs embodied in a non-transitory computer readable medium (e.g., memory 206) that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 can be an example of tangible, computer-readable storage medium that provides storage functionality to store various data and/or program code associated with operation of the controller 202/processor 204, such as software programs and/or code segments, or other data to instruct the processor 204, and possibly other components of the controller 202, to perform the functionality described herein. Thus, the memory 206 can store data, such as a program of instructions for operating the controller 202, including its components (e.g., processor 204, communication interface 208, etc.), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 208 can be operatively configured to communicate with components of the controller 202. For example, the communication interface 208 can be configured to retrieve data from the processor 204 or other devices (e.g., flight management system 210, IRS/AHRS 218, airspeed sensor 220, and/or one or more additional sensors 222), transmit data for storage in the memory 206, retrieve data from storage in the memory 206, and so forth. The communication interface 208 can also be communicatively coupled with the processor 204 to facilitate data transfer between components of the controller 202 and the processor 204. It should be noted that while the communication interface 208 is described as a component of the controller 202, one or more components of the communication interface 208 can be implemented as external components communicatively coupled to the controller 202 via a wired and/or wireless connection. The controller 202 can also include and/or connect to one or more input/output (I/O) devices (e.g., via the communication interface 208), such as a display system 224 (e.g., including display 102 and/or display 104, or display 108 and/or display 110), one or more sensors (e.g., IRS/AHRS 218, airspeed sensor 220, and/or one or more additional sensors 222), an input device (e.g., a flight/mode control panel, a mouse, a trackball, a trackpad, a joystick, a line select device, a touchpad, a touchscreen, a keyboard, a keypad, and/or a microphone (e.g., for voice commands)), and so forth. In embodiments, the communication interface 208 includes or is coupled to a transmitter, receiver, transceiver, physical connection interface, or any combination thereof.

In some embodiments, the controller 202 is part of a flight management system 210. For example, with reference to FIGS. 2A and 2B, the controller 202 may replace or operate in parallel with a controller 212 of the flight management system 210. In this regard, any function or operation performed by the controller 212 can alternatively be performed by controller 202, or vice versa, or the controllers 202 and 212 can perform functions or operations described herein together (e.g., by distributing and/or sharing tasks or portions thereof). In other embodiments, the communication interface 208 may facilitate connectivity between the controller 202 and the flight management system 210. For example, the communication interface 208 can be configured to communicate directly with the flight management system 210 (e.g., via an ad-hoc connection), or may be configured to communicate with the flight management system 210 over a network (e.g., a wired/wireless network).

The flight management system 210 is in communication with an IRS/AHRS 218, airspeed sensor 220, and/or one or more additional sensors 222 (e.g., a groundspeed sensor, vertical acceleration sensor, altimeter, magnetic compass, global navigation satellite system (GNSS) (e.g., GPS, or the like), any combination thereof, or the like). In some embodiments, the flight management system 210 is configured to receive sensor measurements and communicate the sensor measurements to the controller 202. In other embodiments, the controller 202 is a controller of the flight management system 210 and/or is configured to receive the sensor measurements from one or more sensors (e.g., IRS/AHRS 218, airspeed sensor 220, and/or one or more additional sensors 222).

In embodiments, the flight management system 210 includes a controller 212, memory 214, and a communication interface 216. The controller 212 provides processing functionality for at least the flight management system 210 and can include any number of processors, micro-controllers, circuitry, field programmable gate array (FPGA) or other processing systems, and resident or external memory for storing data, executable code, and other information accessed or generated by the flight management system 210. The controller 212 can execute one or more software programs embodied in a non-transitory computer readable medium (e.g., memory 214) that implement techniques described herein. The controller 212 is not limited by the materials from which it is formed or the processing mechanisms employed therein and, as such, can be implemented via semiconductor(s) and/or transistors (e.g., using electronic integrated circuit (IC) components), and so forth.

The memory 214 can be an example of tangible, computer-readable storage medium that provides storage functionality to store various data and/or program code associated with operation of the flight management system 210/controller 212, such as software programs and/or code segments, or other data to instruct the controller 212, and possibly other components of the flight management system 210, to perform the functionality described herein. Thus, the memory 214 can store data, such as a program of instructions for operating the flight management system 210, including its components (e.g., controller 212, communication interface 216, etc.), and so forth. It should be noted that while a single memory 214 is described, a wide variety of types and combinations of memory (e.g., tangible, non-transitory memory) can be employed. The memory 214 can be integral with the controller 212, can comprise stand-alone memory, or can be a combination of both. Some examples of the memory 214 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 216 can be operatively configured to communicate with components of the flight management system 210. For example, the communication interface 216 can be configured to retrieve data from the controller 212 or other devices (e.g., controller 202, IRS/AHRS 218, airspeed sensor 220, and/or one or more additional sensors 222, etc.), transmit data for storage in the memory 214, retrieve data from storage in the memory 214, and so forth. The communication interface 216 can also be communicatively coupled with the controller 212 to facilitate data transfer between components of the flight management system 210 and the controller 212. It should be noted that while the communication interface 216 is described as a component of the flight management system 210, one or more components of the communication interface 216 can be implemented as external components communicatively coupled to the flight management system 210 via a wired and/or wireless connection. The flight management system 210 can also include and/or connect to one or more input/output (I/O) devices (e.g., via the communication interface 216), such as the display system 224, one or more sensors (e.g., IRS/AHRS 218, airspeed sensor 220, and/or one or more additional sensors 222), an input device (e.g., a flight/mode control panel, a mouse, a trackball, a trackpad, a joystick, a line select device, a touchpad, a touchscreen, a keyboard, a keypad, and/or a microphone (e.g., for voice commands)), and so forth. In embodiments, the communication interface 216 includes or is coupled to a transmitter, receiver, transceiver, physical connection interface, or any combination thereof.

The controller 212 can configured to determine a kinematic AOA signal and an aerodynamic AOA signal based on measurements from the airspeed sensor 220 and the IRS/AHRS 218, and possibly further based on measurements collected by one or more additional sensors 222 on the aircraft. For example, the controller 212 can be configured to determine the kinematic AOA signal/values and the aerodynamic AOA signal/values by performing the computations described herein.

Angle of attack ($\alpha$) is characterized by the equation:

$$\tan(\alpha) = \frac{W}{U}$$

where W and U are the vertical and forward body-axis components of the relative wind. These terms are equal to the difference between inertial velocity and the local wind field.

$$U_- = u - u_{wind}$$

$$W_- = w - w_{wind}$$

where u and w are body-axis components of inertial velocity. The term ($u - u_{wind}$) is equal to TAS*cos(a), where TAS is the true airspeed measured by an air data system (e.g., airspeed sensor 220) on the aircraft. Accordingly, the angle of attack ($\alpha$) can be characterized by the equation:

$$\alpha = \sin^{-1}\left(\frac{w - w_{wind}}{TAS}\right)$$

Kinematic AOA Equations

If the above-described characterization of the angle of attack ($\alpha$) is combined with estimated vertical speed (VS) (e.g., determined based on measurements by the IRS/AHRS 218 or obtained via complementary filter of vertical acceleration estimate from AHRS and barometric altitude measurement from an air data system), and a small-angle assumption is made where appropriate, then a may be characterized by the following kinematic estimation:

$$\hat{\alpha} \approx \frac{\theta - \sin^{-1}\left(\frac{VS}{TAS}\right)}{\cos(\phi)} - \frac{w_{wind}}{TAS}$$

where VS is vertical speed, TAS is true airspeed, $\theta$ is Euler pitch, and $\phi$ is Euler roll. The details of this derivation are provided below. As used herein, the "^" marking (e.g., "$\hat{\alpha}$") is used to note estimated values (e.g., estimated AOA values, and the like).

In implementations, $w_{wind}$ cannot be measured, and as such, the $$\frac{w_{wind}}{TAS}$$

term is removed from the equation to provide a kinematic angle of attack ($\alpha$) estimate.

$$\hat{\alpha}_{kinematic} \approx \frac{\theta - \sin^{-1}\left(\frac{VS}{TAS}\right)}{\cos(\phi)}$$

The controller 212 may be configured to determine the kinematic AOA based on IRS/AHRS 218 and airspeed sensor 220 measurements and the equation/expression provided above. Error sources for this expression may include the Euler angle estimates, the vertical speed estimate, the TAS measurement, and the missing $$\frac{w_{wind}}{TAS}$$

term. With a navigation-grade IRS or an AHRS with a tactical or better grade inertial measurement unit, the errors in the Euler angles and vertical speed are negligible. The TAS error will be a small percentage of total TAS. The dominant error term is $$\frac{w_{wind}}{TAS},$$

which may cause high-frequency errors in turbulence, and a bias if flying through a sustained updraft or downdraft.

Derivation of Kinematic AOA

A derivation of the kinematic AOA equation begins with the equation for the AOA:

$$\alpha = \sin^{-1}\left(\frac{w - w_w}{TAS}\right)$$

Here $\alpha$ is AOA in radians, w is a projection of inertial velocity vector on Z body axis in m/sec, $w_w$ is a projection of wind velocity on Z body axis in m/sec.

It can be assumed that VS is a perfect estimate of vertical speed, defined as positive up. In that case $$VS = u*\sin(\theta) - v*\cos(\theta)\sin(\phi) - w*\cos(\theta)\cos(\phi)$$

Here u and v are projections of the inertial velocity vector on body X and Y axes, respectively. $\theta$ is Euler pitch angle in radians, and $\phi$ is Euler roll angle in radians. This can be derived by calculating a projection of the inertial velocity vector [u v w] on the upward direction of the local vertical.

Both sides of the above equation can be divided by TAS, assuming that this algorithm is only used when TAS is above a certain value.

$$\frac{VS}{TAS} = \frac{u*\sin(\theta)}{TAS} - \frac{v*\cos(\theta)\sin(\phi)}{TAS} - \frac{w*\cos(\theta)\cos(\phi)}{TAS}$$

Next, body axis wind components can be added and subtracted along each axis.

$$\frac{VS}{TAS} = \frac{(u-u_w)*\sin(\theta)}{TAS} - \frac{(v-v_w)*\cos(\theta)\sin(\phi)}{TAS} - \frac{(w-w_w)*\cos(\theta)\cos(\phi)}{TAS} + \ldots \frac{u_w*\sin(\theta)}{TAS} - \frac{v_w*\cos(\theta)\sin(\phi)}{TAS} - \frac{w_w*\cos(\theta)\cos(\phi)}{TAS}$$

Note that the components of the true airspeed vector on the aircraft body axis can be expressed as follows in terms of the flow angles:

$$\begin{bmatrix} TAS*\cos(\alpha)\cos(\beta) \\ TAS*\cos(\alpha)\sin(\beta) \\ TAS*\sin(\alpha) \end{bmatrix} = \begin{bmatrix} u-u_w \\ v-v_w \\ w-w_w \end{bmatrix}$$

It can be assumed that the aircraft is flying coordinated (i.e., the sideslip angle is close to zero, ≈0). It can be further assumed that angle of attack ($\alpha$) is small enough that a small angle approximation could be used for the trigonometric functions (i.e., $\cos(\alpha) \approx 1$, and $\sin(\alpha) \approx \alpha$). Then, the previous two equations can be combined and a small angle approximation for the trigonometric functions can be used to provide the following expression:

$$\frac{VS}{TAS} \approx \sin(\theta) - \alpha\cos(\theta)\cos(\phi) + \frac{u_w}{TAS}\sin(\theta) - \frac{v_w}{TAS}\sin(\theta) - \frac{w_w}{TAS}\cos(\theta)\cos(\phi)$$

Rearranging the terms, the expression can be rewritten as follows:

$$\alpha = \frac{\sin(\theta) - \frac{VS}{TAS}}{\cos(\theta)\cos(\phi)} + \frac{u_w\tan(\theta)}{TAS\cos(\phi)} - \frac{v_w}{TAS}\tan(\phi) - \frac{w_w}{TAS}$$

It can also be assumed that AOA will be computed only when pitch angle $\theta$ is small enough (|$\theta$|<0.5 radians), such that small angle approximations can be used for the trigonometric functions of $\theta$: $\tan(\theta) \approx 0$, and $\cos(\theta) \approx 1$. Furthermore, it can be assumed that an aerodynamic flight path angle is also small enough for using a small angle approximation for a trigonometric function.

$$\gamma = \sin^{-1}\left(\frac{VS}{TAS}\right) \approx \frac{VS}{TAS}$$

Applying small angle approximations then results in the expression:

$$\alpha \approx \frac{\theta - \gamma}{\cos(\phi)} + \frac{u_w\theta}{TAS\cos(\phi)} - \frac{v_w}{TAS}\tan(\phi) - \frac{w_w}{TAS}$$

Since projections of the wind components on the body axes are in general not assumed to be available, the following approximate expression is derived for the kinematic AOA.

$$\alpha \approx \frac{\theta - \sin^{-1}\left(\frac{VS}{TAS}\right)}{\cos(\phi)}$$

Aerodynamic AOA Equations

In embodiments, the IRS/AHRS 218 includes accelerometers and/or gyroscopes that can be used to determine the aircraft's z-axis force coefficient (Cz). The expressions below illustrate the derivation of (Cz):

$$A_z = \frac{F_z}{m}$$

$$F_z = \bar{q}SC_z$$

$$C_z = \frac{A_z m}{\bar{q}S}$$

Here, m is the aircraft mass, $\bar{q}$ is dynamic pressure, S is the reference wing area, and $A_z$ is z-axis acceleration at the aircraft center-of-gravity (CG). Dynamic pressure is measured by the air data system and wing area is a fixed (known) parameter, but mass must be estimated (as discussed later). Since the IRS/AHRS 218 is unlikely to be located at the CG, the IRS/AHRS 218 accelerometer measurement can be translated to the CG as follows:

$$A_z = A_{z,IMU} - (pr-\dot{q})*d_x - (qr+\dot{p})*d_y + (p^2+q^2)*d_z$$

where p, q, and r are the angular rate measurements from the IRS/AHRS 218 and $d_x$, $d_y$, $d_z$ are the distances from the CG to the IRS/AHRS 218 along the aircraft body axes.

An exact expression for Cz would be a nonlinear function of $\alpha$, $\beta$, control surface positions, and likely other terms. However, Cz is well-approximated as an affine function with respect to the angle of attack ($\alpha$), summed with contributions from the aircraft effectors ($\delta_e$ elevator, of flaps, $\delta f$ plus spoilers, engines, and possibly others).

$$C_z \approx C_{z_0} + C_{z_\alpha}\alpha + C_{z_{\delta e}}\delta e + C_{z_{\delta f}}\delta f + \ldots$$

Here $C_{z_0}$ is the zero angle-of-attack force coefficient, $C_{z_\alpha}$ is the force coefficient slope with respect to the angle of attack ($\alpha$), $C_{z_{\delta e}}$ is elevator force coefficient, $\delta_e$ is elevator deflection angle, $C_{z_{\delta f}}$ is the flap force coefficient, and $\delta f$ is flap deflection angle. If the effector positions are known, they can be included in the estimation of $\alpha$. Otherwise, they will introduce errors ($\delta C_z$ in the following equation).

$$\alpha \approx \frac{C_Z - C_{z0} - (\text{effectors } C_z \text{ contribution}) - \delta C_Z}{C_{z_\alpha}}$$

$$\hat{a}_{aero} \approx \frac{\frac{A_z m}{\bar{q}S} - C_{z0} - (\text{effectors } C_z \text{ contribution})}{C_{z_\alpha}}$$

In addition to errors from the unmodeled Cz effectors, this equation has errors from sensed Az and $\bar{q}$, the estimated mass m, and the modeled aerodynamic terms. The effects of Az and $\bar{q}$ errors are likely small, but these signals may have large noise components. In some embodiments, the flight management system 210 may have information about vehicle mass input from the weight-and-balance planning, and then calculated from measured or estimated fuel burn during the flight. In such aircraft, the mass error would be small. If mass is unknown, then the mass error will be a dominant error source that scales with $$\frac{A_z}{\overline{q}}.$$

The Cz aerodynamic coefficient will be likely known with good accuracy. However, if an affine function does not accurately model Cz with respect to a, then a nonlinear function or lookup tables can be easily substituted into the $\hat{a}_{aero}$ equation.

Using the above algorithms, the controller 212 can be configured to determine kinematic and aerodynamic AOA signals or values. For example, the controller 212 can be configured to determine the kinematic AOA based on vertical speed, true airspeed, Euler pitch, and Euler roll measurements collected by the airspeed sensor 220 and the IRS/AHRS 218. For instance, the controller 212 may be configured to input the measurements into the following equation:

$$\hat{\alpha}_{kinematic} \approx \frac{\theta - \sin^{-1}\left(\frac{VS}{TAS}\right)}{\cos(\phi)}$$

where $\hat{\alpha}_{kinematic}$ is the kinematic AOA, VS is vertical speed, TAS is true airspeed, θ is Euler pitch, and φ is Euler roll. The controller 212 can also be configured to determine the aerodynamic AOA based on a z-axis force coefficient for the aircraft, mass of the aircraft, dynamic pressure, reference wing area, and z-axis acceleration of the aircraft measured by the IRS/AHRS 218. For instance, the controller 212 may be configured to input the measurements into the following equation:

$$\hat{a}_{aero} \approx \frac{\frac{A_z m}{\overline{q} S} - C_{z0} - (\text{effectors } C_z \text{ contribution})}{C_{z_\alpha}}$$

where $\hat{a}_{aero}$ is the aerodynamic AOA, $A_z$ is the z-axis acceleration, m is the mass of the aircraft, $\overline{q}$ is the dynamic pressure, S is the reference wing area, $C_{z0}$ is a nominal z-axis force coefficient for the aircraft, $C_{z_\alpha}$ is the z-axis force coefficient with respect to the angle of attack, and (effectors $C_z$ contribution) is a summation of z-axis force coefficient contributions by effectors on the aircraft.

Blended AOA Solution

The error sources of the different (kinematic and aerodynamic) AOA estimates have different steady-state and high-frequency characteristics, and can thus benefit from being blended in a complementary filter. $\hat{\alpha}_{kinematic}$ is accurate over the majority of the flight, since the term $w_{wind}$ goes to zero if averaged over a long enough period. Even the most severe updraft/downdraft conditions only exist over a region of several kilometers, and thus would persist for no longer than 1 minute continuously. There is also a need for accurate high-frequency AOA information, as during an updraft the pilot must know quickly to lower the nose to avoid stall. $\hat{a}_{aero}$ estimates AOA directly from the body acceleration, and is capable of immediately responding to a vertical wind change. However, $\hat{a}_{aero}$ may have an error bias in steady state due to inaccuracy in the aerodynamic model or mass estimation. $\hat{a}_{aero}$ should also be filtered at high frequency to avoid transmitting IRS/AHRS 218 and air data sensor (e.g., airspeed sensor 220) noise.

To achieve the benefits of both, the kinematic and aerodynamic, AOA estimates, the controller 212 is configured to generate a blended AOA signal or value ($\hat{\alpha}_{blend}$), with good error characteristics across all frequencies, by summing low-pass-filtered $\hat{\alpha}_{kinematic}$ and band-pass-filtered $\hat{a}_{aero}$. For example, the controller 212 can be configured to apply a low-pass filter to the kinematic AOA signal ($\hat{\alpha}_{kinematic}$) and further configured to apply a band-pass filter to the aerodynamic AOA signal ($\hat{a}_{aero}$). The controller 212 can be configured to determine the blended AOA signal ($\hat{\alpha}_{blend}$) by summing the filtered kinematic and aerodynamic AOA signals. In embodiments, the controller 212 may be configured to determine the blended AOA signal ($\hat{\alpha}_{blend}$) for the aircraft based on the $\hat{\alpha}_{kinematic}$ and $\hat{a}_{aero}$ signals. The blended AOA signal ($\hat{\alpha}_{blend}$) can be represented by the following transfer function:

$$\hat{\alpha}_{blend}(s) = \left(\frac{1}{K_1 s + 1}\right)\hat{\alpha}_{kinematic} + \left(\frac{K_1 s}{K_1 s + 1}\right)\left(\frac{1}{K_2 s + 1}\right)\hat{a}_{aero}$$

where $K_1$ and $K_2$ are constants, and s is a transfer function argument.

In embodiments, the controller 212 is configured to present AOA information (e.g., the blended AOA signal or value determinations) via the display system 224 (e.g., via display 102, 104, 108, or 110). In some embodiments, the flight management system 210 is directly coupled to the display system 224, and the controller 212 may be configured to generate signals that cause the display system 224 to present the AOA information. In other embodiments, the flight management system 210 (e.g., via controller 212) is configured to transmit data (e.g., AOA information and/or instructions) to another controller 202, and the other controller 202 may be configured to generate signals that cause the display system 224 to present the AOA information.

In addition to being shown on a display for pilot situational awareness, AOA can potentially be used as an input to autopilot software or for other functions such as automatic stall prevention. For example, the controller 212 may be configured to transmit AOA information to other avionics equipment 226 (e.g., enhanced ground proximity warning system (EGPWS), autopilot computer, or the like).

As previously noted herein, controllers 202 and 212 may be combined into a single controller (e.g., controller 212) or may be distributed (e.g., as shown in FIGS. 2A and 2B). Furthermore, any function or operation performed by controller 212 can alternatively be performed by controller 202, or vice versa, or the controllers 202 and 212 can be configured to operate in parallel to perform tasks together (e.g., by each performing a distributed portion of the task).

Figure 3:
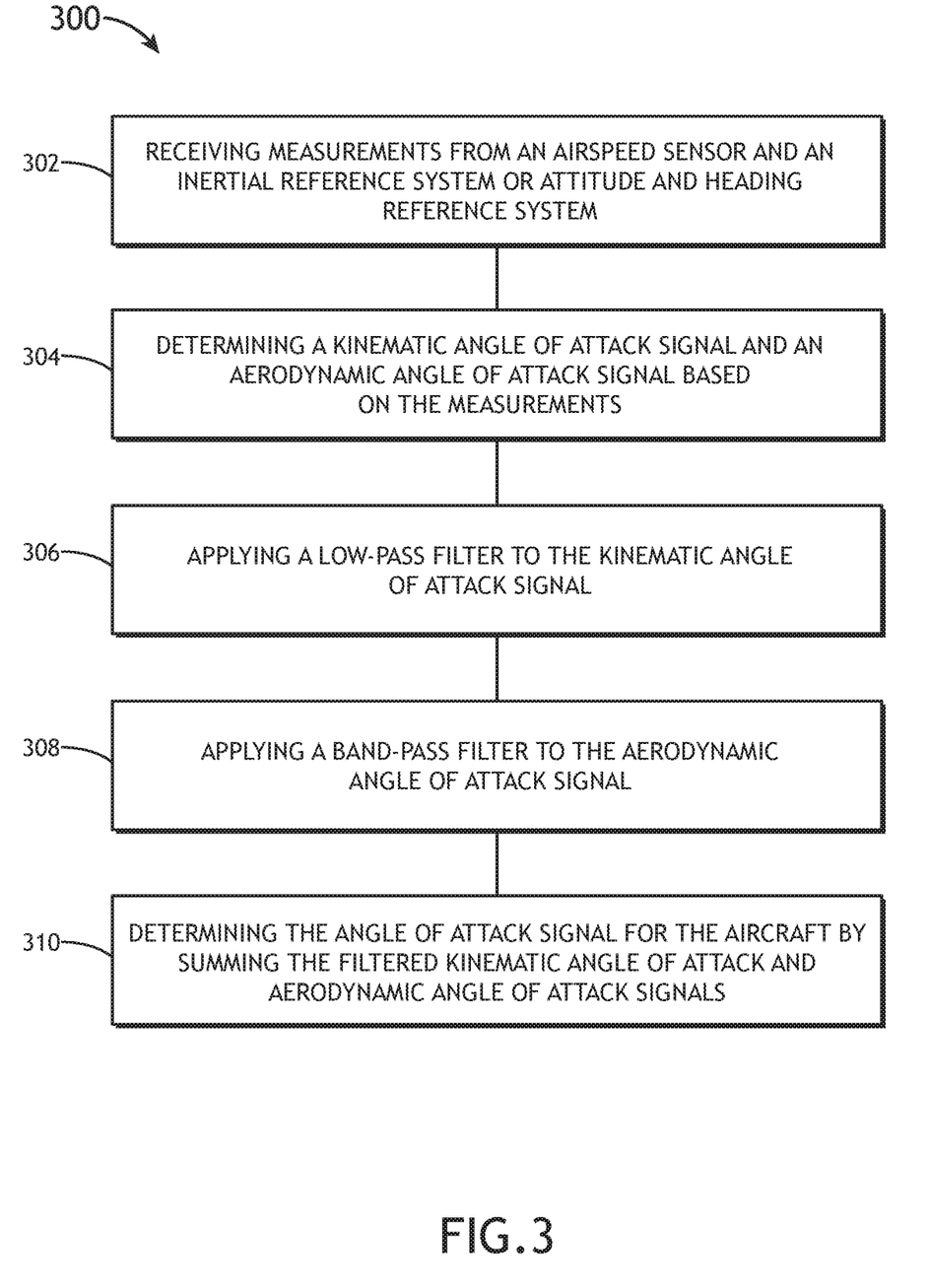
FIG. 3 is a flow diagram illustrating an example implementation of a method of determining AOA for an aircraft.

FIG. 3 illustrates an example implementation of a method 300 for determining AOA for an aircraft. In general, operations of disclosed processes (e.g., method 300) may be performed in an arbitrary order, unless otherwise provided herein. In implementations, the method 300 may be carried out by the system 200 described herein. In this regard, the method 300 may include any step or operation implied or required by the embodiments of the system 200 described herein. The system 200 can also include any additional component or functionality expressed or implied by the method 300. However, the method 300 is not limited to any embodiment of the system 200 and may be carried out by other devices or configurations of the devices that perform the following steps or operations.

In implementations, the method 300 includes receiving measurements from a measurements received from a vertical speed sensor, an airspeed sensor, and an IRS or AHRS (block 302). A kinematic AOA signal and an aerodynamic AOA signal are then determined based on the measurements received from the vertical speed sensor, the airspeed sensor, and the IRS/AHRS (block 304). For example, as described above, the controller 212 (and/or 202) can be configured to determine the kinematic AOA and the aerodynamic AOA for the aircraft based on measurements from the IRS/AHRS 218 and airspeed sensor 220. The method 300 further includes apply a low pass filter to the kinematic AOA signal (block 306) and applying a band-pass filter to the aerodynamic AOA signal (block 308). A blended AOA signal for the aircraft is then determined by summing the filtered kinematic AOA and aerodynamic AOA signals (block 310). For example, the controller 212 (and/or controller 202) may be configured to determine the blended AOA signal ($\hat{\alpha}_{blend}$) for the aircraft based on the kinematic AOA ($\hat{\alpha}_{kinematic}$) and aerodynamic AOA ($\hat{a}_{aero}$) signals, where the blended AOA signal ($\hat{\alpha}_{blend}$) is represented by the following transfer function:

$$\hat{\alpha}_{blend}(s) = \left(\frac{1}{K_1 s + 1}\right)\hat{\alpha}_{kinematic} + \left(\frac{K_1 s}{K_1 s + 1}\right)\left(\frac{1}{K_2 s + 1}\right)\hat{a}_{aero}$$

where $K_1$ and $K_2$ are constants, and s is a transfer function argument. In some implementations, the AOA information (e.g., AOA signal/vale estimates) are presented via a display (e.g., aircraft display system 224). In some embodiments, the AOA information may also be transmitted to other avionics equipment 226 (e.g., as an input to EGPWS, an autopilot computer, or the like).

Figure 4:
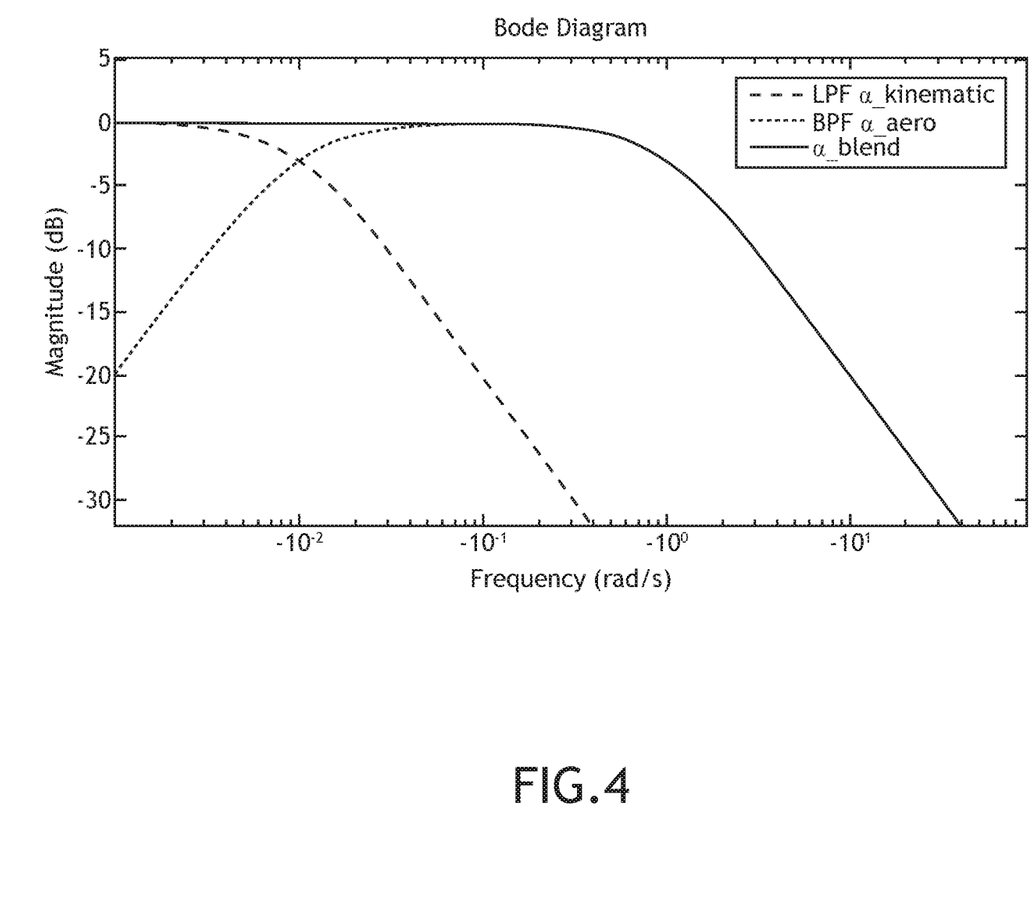
FIG. 4 shows an example of a graphical plot illustrating complementary filtering applied to kinematic and aerodynamic AOA signals to determine blended AOA signal.

FIG. 4 is a Bode diagram illustrating an example of a blended AOA signal in comparison to a low-pass filtered kinematic signal and a band-pass filtered aerodynamic AOA signal. In some embodiments, filter properties can be modified a function of flight condition to reduce errors. Furthermore, if data can be stored over a long duration, then constructing a least-squares estimator of the aerodynamic coefficients may reduce errors in those terms.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for determining an angle of attack signal for an aircraft, comprising:
   an airspeed sensor;
   an inertial reference system or attitude and heading reference system; and
   a controller in communication with the airspeed sensor and the inertial reference system or attitude and heading reference system, the controller configured to:
     receive measurements from the airspeed sensor and the inertial reference system or attitude and heading reference system;
     determine a kinematic angle of attack signal and an aerodynamic angle of attack signal based on the measurements from the airspeed sensor and the inertial reference system or attitude and heading reference system;
     apply a low-pass filter to the kinematic angle of attack signal;
     apply a band-pass filter to the aerodynamic angle of attack signal;
     determine the angle of attack signal for the aircraft by summing the filtered kinematic angle of attack and aerodynamic angle of attack signals, wherein the angle of attack signal is a blended angle of attack signal, the blended angle of attack signal having suitable error characteristics across all frequencies such that the blended angle of attack signal has both (i) steady-state characteristics from the kinematic angle of attack signal that provide angle of attack accuracy over a majority of a flight and (ii) frequency characteristics from the aerodynamic angle of attack signal that provide angle of attack accuracy during an updraft or downdraft that persists for less than one minute of the flight; and
     output the angle of attack signal to avionics equipment and a display for presentation to a user;
   the display in communication with the controller, the display configured to display angle of attack information based at least on the angle of attack signal; and
   the avionics equipment in communication with the controller, wherein the avionics equipment uses the angle of attack signal as an input to an autopilot system and or automatic stall prevention system.

2. The system of claim 1, wherein the angle of attack signal for the aircraft is characterized by the transfer function:

$$\hat{\alpha}_{blend}(s) = \left(\frac{1}{K_1 s + 1}\right)\hat{\alpha}_{kinematic} + \left(\frac{K_1 s}{K_1 s + 1}\right)\left(\frac{1}{K_2 s + 1}\right)\hat{a}_{aero}$$

where $\hat{\alpha}_{blend}$ is the angle of attack signal for the aircraft, $\hat{\alpha}_{kinematic}$ is the kinematic angle of attack signal, $\hat{a}_{aero}$ is the aerodynamic angle of attack signal, $K_1$ and $K_2$ are constants, and s is a transfer function argument.

3. The system of claim 1, wherein the controller is configured to determine the kinematic angle of attack signal based on vertical speed, true airspeed, Euler pitch, and Euler roll measurements collected by the airspeed sensor and the inertial reference system or an attitude and heading reference system.

4. The system of claim 3, wherein the kinematic angle of attack signal is characterized by the equation:

$$\hat{\alpha}_{kinematic} \approx \frac{\theta - \sin^{-1}\left(\frac{VS}{TAS}\right)}{\cos(\phi)}$$

where $\hat{\alpha}_{kinematic}$ is the kinematic angle of attack signal, VS is vertical speed, TAS is true airspeed, $\theta$ is Euler pitch, and $\phi$ is Euler roll.

5. The system of claim 1, wherein the controller is configured to determine the aerodynamic angle of attack signal based on a z-axis force coefficient for the aircraft, mass of the aircraft, dynamic pressure, reference wing area, and z-axis acceleration of the aircraft measured by the inertial reference system or attitude and heading reference system.

6. The system of claim 5, wherein the aerodynamic angle of attack signal is characterized by the equation:

$$\hat{a}_{aero} \approx \frac{\frac{A_z m}{\bar{q}S} - C_{z0} - (\text{effectors } C_z \text{ contribution})}{C_{z_\alpha}}$$

where $\hat{a}_{aero}$ is the aerodynamic angle of attack signal, $A_z$ is the z-axis acceleration, m is the mass of the aircraft, $\bar{q}$ is the dynamic pressure, S is the reference wing area, $C_{z0}$ is a nominal z-axis force coefficient for the aircraft, $C_{z_\alpha}$ is the z-axis force coefficient with respect to the angle of attack, and (effectors $C_z$ contribution) is a summation of z-axis force coefficient contributions by effectors on the aircraft.

7. A controller for determining an angle of attack signal for an aircraft, comprising:
 a processor; and
 a memory medium communicatively coupled to the processor, the memory medium including program instructions that are executable by the processor and configured to cause the processor to:
  receive measurements from an airspeed sensor and an inertial reference system or attitude and heading reference system;
  determine a kinematic angle of attack signal and an aerodynamic angle of attack signal based on measurements from the airspeed sensor and the inertial reference system or attitude and heading reference system;
  apply a low-pass filter to the kinematic angle of attack signal;
  apply a band-pass filter to the aerodynamic angle of attack signal;
  determine the angle of attack signal for the aircraft by summing the filtered kinematic angle of attack and aerodynamic angle of attack signals, wherein the angle of attack signal is a blended angle of attack signal, the blended angle of attack signal having suitable error characteristics across all frequencies such that the blended angle of attack signal has both (i) steady-state characteristics from the kinematic angle of attack signal that provide angle of attack accuracy over a majority of a flight and (ii) frequency characteristics from the aerodynamic angle of attack signal that provide angle of attack accuracy during an updraft or downdraft that persists for less than one minute of the flight; and
  output the angle of attack signal to avionics equipment and a display for presentation to a user, wherein the avionics equipment uses the angle of attack signal as an input to an autopilot system and or automatic stall prevention system.

8. The controller of claim 7, wherein the angle of attack signal for the aircraft is characterized by the transfer function:

$$\hat{\alpha}_{blend}(s) = \left(\frac{1}{K_1 s + 1}\right)\hat{\alpha}_{kinematic} + \left(\frac{K_1 s}{K_1 s + 1}\right)\left(\frac{1}{K_2 s + 1}\right)\hat{a}_{aero}$$

where $\hat{\alpha}_{blend}$ is the angle of attack signal for the aircraft, $\hat{\alpha}_{kinematic}$ is the kinematic angle of attack signal, $\hat{a}_{aero}$ is the aerodynamic angle of attack signal, $K_1$ and $K_2$ are constants, and s is a transfer function argument.

9. The controller of claim 7, wherein the kinematic angle of attack signal is determined based on vertical speed, true airspeed, Euler pitch, and Euler roll measurements collected by the airspeed sensor and the inertial reference system or attitude and heading reference system.

10. The controller of claim 9, wherein the kinematic angle of attack signal is characterized by the equation:

$$\hat{\alpha}_{kinematic} \approx \frac{\theta - \sin^{-1}\left(\frac{VS}{TAS}\right)}{\cos(\phi)}$$

where $\hat{\alpha}_{kinematic}$ is the kinematic angle of attack signal, VS is vertical speed, TAS is true airspeed, $\theta$ is Euler pitch, and $\phi$ is Euler roll.

11. The controller of claim 7, wherein the aerodynamic angle of attack signal is determined based on a z-axis force coefficient for the aircraft, mass of the aircraft, dynamic pressure, reference wing area, and z-axis acceleration of the aircraft measured by the inertial reference system or attitude and heading reference system.

12. The controller of claim 11, wherein the aerodynamic angle of attack signal is characterized by the equation:

$$\hat{a}_{aero} \approx \frac{\frac{A_z m}{\bar{q}S} - C_{z0} - (\text{effectors } C_z \text{ contribution})}{C_{z_\alpha}}$$

where $\hat{a}_{aero}$ is the aerodynamic angle of attack signal, $A_z$ is the z-axis acceleration, m is the mass of the aircraft, $\bar{q}$ is the dynamic pressure, S is the reference wing area, $C_{z0}$ is a nominal z-axis force coefficient for the aircraft, $C_{z_\alpha}$ is the z-axis force coefficient with respect to the angle of attack, and (effectors $C_z$ contribution) is a summation of z-axis force coefficient contributions by effectors on the aircraft.

13. A method of determining an angle of attack signal for an aircraft, comprising:
 receiving measurements from an airspeed sensor and an inertial reference system or attitude and heading reference system;
 determining a kinematic angle of attack signal and an aerodynamic angle of attack signal based on the measurements received from the airspeed sensor, and the inertial reference system or attitude and heading reference system;
 applying a low-pass filter to the kinematic angle of attack signal;

applying a band-pass filter to the aerodynamic angle of attack signal;

determining the angle of attack signal for the aircraft by summing the filtered kinematic angle of attack and aerodynamic angle of attack signals, wherein the angle of attack signal is a blended angle of attack signal, the blended angle of attack signal having suitable error characteristics across all frequencies such that the blended angle of attack signal has both (i) steady-state characteristics from the kinematic angle of attack signal that provide angle of attack accuracy over a majority of a flight and (ii) frequency characteristics from the aerodynamic angle of attack signal that provide angle of attack accuracy during an updraft or downdraft that persists for less than one minute of the flight;

outputting the angle of attack signal to avionics equipment and a display for presentation to a user;

displaying angle of attack information based at least on the angle of attack signal; and using, by the avionics equipment, the angle of attack signal as an input to an autopilot system and or automatic stall prevention system.

14. The method of claim 13, wherein the angle of attack signal for the aircraft is characterized by the transfer function:

$$\hat{\alpha}_{blend}(s) = \left(\frac{1}{K_1 s + 1}\right)\hat{\alpha}_{kinematic} + \left(\frac{K_1 s}{K_1 s + 1}\right)\left(\frac{1}{K_2 s + 1}\right)\hat{a}_{aero}$$

where $\hat{\alpha}_{blend}$ is the angle of attack signal for the aircraft, $\hat{\alpha}_{kinematic}$ is the kinematic angle of attack signal, $\hat{a}_{aero}$ is the aerodynamic angle of attack signal, where $K_1$ and $K_2$ are constants, and s is a transfer function argument.

15. The method of claim 13, wherein the kinematic angle of attack signal is determined based on vertical speed, true airspeed, Euler pitch, and Euler roll measurements collected by the airspeed sensor and the inertial reference system or attitude and heading reference system.

16. The method of claim 15, wherein the kinematic angle of attack signal is characterized by the equation:

$$\hat{\alpha}_{kinematic} \approx \frac{\theta - \sin^{-1}\left(\frac{VS}{TAS}\right)}{\cos(\phi)}$$

where $\hat{\alpha}_{kinematic}$ is the kinematic angle of attack signal, VS is vertical speed, TAS is true airspeed, $\theta$ is Euler pitch, and $\phi$ is Euler roll.

17. The method of claim 13, wherein the aerodynamic angle of attack signal is determined based on a z-axis force coefficient for the aircraft, mass of the aircraft, dynamic pressure, reference wing area, and z-axis acceleration of the aircraft measured by the inertial reference system or attitude and heading reference system.

18. The method of claim 17, wherein the aerodynamic angle of attack signal is characterized by the equation:

$$\hat{a}_{aero} \approx \frac{\frac{A_z m}{\bar{q} S} - C_{z0} - (\text{effectors } C_z \text{ contribution})}{C_{z_\alpha}}$$

where $\hat{a}_{aero}$ is the aerodynamic angle of attack signal, $A_z$ is the z-axis acceleration, m is the mass of the aircraft, $\bar{q}$ is the dynamic pressure, S is the reference wing area, $C_{z0}$ is a nominal z-axis force coefficient for the aircraft, $C_{z_\alpha}$ is the z-axis force coefficient with respect to the angle of attack, and (effectors $C_z$ contribution) is a summation of z-axis force coefficient contributions by effectors on the aircraft.

19. The method of claim 17, wherein the z-axis force coefficient with respect to the angle of attack is determined using a lookup table or a nonlinear function.

20. The method of claim 13, wherein the low-pass and band-pass filters are modified based on one or more flight conditions.

* * * * *